(12) United States Patent
Bezaire et al.

(10) Patent No.: US 8,800,844 B2
(45) Date of Patent: Aug. 12, 2014

(54) REINFORCEMENT OF FRICTION PLUG WELDS

(71) Applicant: The Boeing Company, Chicago, IL (US)

(72) Inventors: David M. Bezaire, San Luis Obispo, CA (US); John M. Comfort, Corona, CA (US); John G. Vollmer, Lomita, CA (US); Mark A. Fischer, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/662,550

(22) Filed: Oct. 29, 2012

(65) Prior Publication Data

US 2013/0048786 A1   Feb. 28, 2013

Related U.S. Application Data

(62) Division of application No. 12/557,715, filed on Sep. 11, 2009.

(51) Int. Cl.
*B23K 20/12* (2006.01)

(52) U.S. Cl.
CPC ............ *B23K 20/12* (2013.01); *B23K 20/1205* (2013.01); *B23K 20/122* (2013.01); *B23K 20/129* (2013.01); *B23K 20/1215* (2013.01); *B23K 20/1295* (2013.01); *B23K 20/127* (2013.01); *B23K 20/1275* (2013.01); *B23K 20/128* (2013.01); *B23K 20/1285* (2013.01)
USPC .......... 228/2.1; 228/113; 228/114; 228/112.1

(58) Field of Classification Search
CPC .. B23K 20/12; B23K 20/1205; B23K 20/122; B23K 20/129; B23K 20/1215; B23K 20/1295; B23K 20/127; B23K 20/1275; B23K 20/128; B23K 20/1285
USPC ................................ 228/112.1, 113, 114, 2.1
See application file for complete search history.

(56) References Cited

U.S. PATENT DOCUMENTS

| | | | |
|---|---|---|---|
| 5,975,406 A | 11/1999 | Mahoney et al. | |
| 6,253,987 B1 | 7/2001 | Coletta et al. | |
| 6,742,697 B2 | 6/2004 | McTernan et al. | |
| 6,880,743 B1 | 4/2005 | Coletta et al. | |
| 6,986,452 B2 | 1/2006 | Dracup et al. | |
| 7,726,541 B2 | 6/2010 | Maciel | |
| 2002/0027156 A1* | 3/2002 | Coletta et al. | 228/114.5 |
| 2002/0125297 A1* | 9/2002 | Stol et al. | 228/112.1 |
| 2003/0201306 A1 | 10/2003 | McTernan et al. | |
| 2006/0131364 A1 | 6/2006 | Bouet et al. | |
| 2009/0179065 A1 | 7/2009 | Maciel | |
| 2011/0062219 A1 | 3/2011 | Bezaire et al. | |

OTHER PUBLICATIONS

Office Action, dated Oct. 4, 2010, regarding U.S. Appl. No. 12/557,715, 12 pages.

(Continued)

*Primary Examiner* — Erin Saad
(74) *Attorney, Agent, or Firm* — Yee & Associates, P.C.

(57) ABSTRACT

A hole in a metal workpiece is filled by friction plug welding. The weld between the workpiece and the plug is reinforced by a weld land in the workpiece that surrounds one end of the plug. The weld land is formed by extruding a portion of the plug into a cavity in an anvil used in the welding process.

16 Claims, 7 Drawing Sheets

(56) References Cited

OTHER PUBLICATIONS

Reponse to Office Action, dated Jan. 27, 2011, regarding U.S. Appl. No. 12/557,715, 17 pages.
Final Office Action, dated Mar. 3, 2011, regarding U.S. Appl. No. 12/557,715, 15 pages.
Response to Final Office Action, dated Jun. 8, 2011, regarding U.S. Appl. No. 12/557,715, 17 pages.
Office Action, dated Jul. 1, 2011, regarding U.S. Appl. No. 12/557,715, 11 pages.
Respons to Office Action, dated Oct. 31, 2011, regarding U.S. Appl. No. 12/557,715, 20 pages.
Final Office Action, dated Dec. 21, 2011, regarding U.S. Appl. No. 12/557,715, 10 pages.
Amendment Pursuant to Request for Continued Examination, dated Feb. 22, 2012, regarding U.S. Appl. No. 12/557,715, 9 pages.
Office Action, dated Apr. 26, 2012, regarding U.S. Appl. No. 12/557,715, 12 pages.
Response to Office Action, dated Jul. 26, 2012, regarding U.S. Appl. No. 12/557,715, 9 pages.
Notice of Allowance, dated Aug. 31, 2012, regarding U.S. Appl. No. 12/557,715, 9 pages.

* cited by examiner

FIG. 20 ial cost. The disclosed embodiments may also be used in connection with building up various types of blanks that may be formed into parts through forging, machining or other processes.

REINFORCEMENT OF FRICTION PLUG WELDS

This application is a divisional of application of U.S. application Ser. No. 12/557,715, entitled "REINFORCEMENT OF FRICTION PLUG WELDS," filed Sep. 11, 2009, status Pending.

TECHNICAL FIELD

This disclosure generally relates to welding processes, especially friction and forge welding, and deals more particularly with a method and apparatus for reinforcing friction plug welds.

BACKGROUND

Friction welding is a type of solid-state welding process that generates heat through mechanical friction between a moving workpiece and a stationary component in combination with a lateral force that plastically displaces and fuses the materials. Friction welding may be used with a variety of metals and thermoplastics in a wide range of applications, including those in the aerospace, marine and automotive industries. Friction welding may be advantageous in some applications compared to other welding processes for a variety of reasons, including the ability to join dissimilar materials, relatively short joining times and the ability to limit heat input to the weld interface.

In one application of friction welding, referred to as friction plug welding, a tapered plug is friction welded into a tapered hole in a substrate. This welding technique may be used to repair castings or to fill holes that occur on the completion of a friction stir welding pass when a stirring probe is withdrawn from the weld.

The weld strength properties of friction plug welds along the line of the fusion may be less than desired in some applications. For example, when used to close a termination hole on a circumferential friction stir weld on a tank, the strength of the friction plug weld along its line of fusion with the parent tank material may be less than the strength of the friction stir weld.

Accordingly, it would be desirable to provide a method and apparatus for friction plug welding that exhibits improved weld strength properties.

SUMMARY

The disclosed embodiments provide a method and apparatus for making friction plug welds that include reinforcement. The reinforcement is formed by a weld land that surrounds the plug and increases the strength of the plug weld. The additional strength provided by the weld land may allow the weld to perform more consistently and with increased load carrying capability. Repairs made with the disclosed friction plug welding method may be rated at higher strength capacities, and other load bearing structures incorporating such welds may be designed to carry greater loads. The disclosed embodiments may be used in a variety of applications including, but not limited to, closing termination holes in friction stir welds, repairing parts such as castings, and attaching components to structures. Higher weld strengths may be achieved without substantially increasing time and/or material cost. The disclosed embodiments may also be used in connection with building up various types of blanks that may be formed into parts through forging, machining or other processes.

BRIEF DESCRIPTION OF THE ILLUSTRATIONS

DETAILED DESCRIPTION

Figure 1:
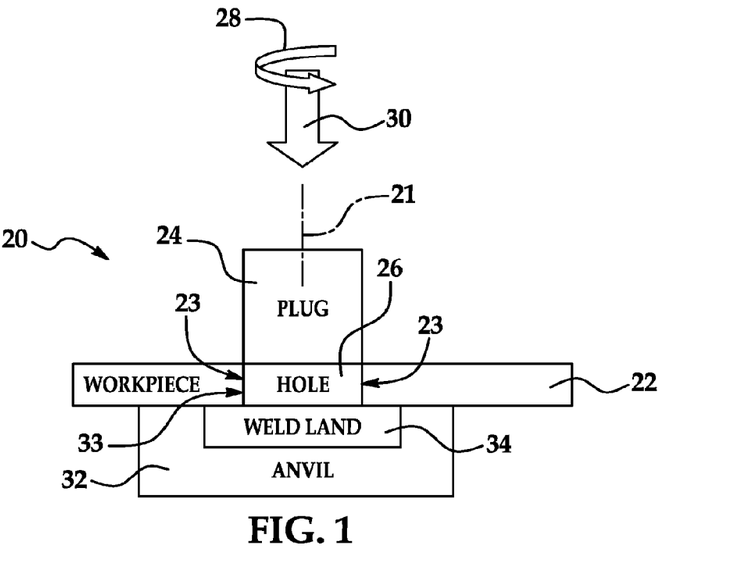
FIG. 1 is an illustration of a functional block diagram of apparatus used to make reinforced friction plug welds.

Referring first to FIG. 1, apparatus generally indicated by the numeral 20 may be used to carry out a method of making reinforced friction plug welds. The disclosed method and apparatus 20 are particularly useful in making friction plug welds between metal materials such as aluminum alloys, however the welded parts may comprise other materials, such as without limitation, thermoplastics. A shaped plug 24 is spun about its longitudinal axis 21, as shown by the arrow 28 as a force 30 is applied to the plug 24 that forces the spinning plug 24 through a hole 26 in a workpiece 22. Friction generated between the spinning plug 24 and the workpiece 22 as the plug 24 is being forced through the hole 26 produces heat that plasticizes both the plug 24 and the workpiece 22 at their frictional interface 23 to produce a weld 33.

As the spinning plug 24 is forced through the hole 26, the plug 24 engages and is forced against an anvil 32 that is configured to extrude the plasticized plug 24 and the workpiece 22 in a manner that forms a weld land 34 in the workpiece 22 surrounding the plug 24 and the weld 33. After the spinning plug 24 has been plunged through the hole 26 and against the anvil 32, the torque used to spin the plug 24 is removed, resulting in the plug 24 coming to a stop, however the force 30 may be maintained for a short period, causing the plug 24 to be forge welded to the workpiece 22. The weld land 34 functions to reinforce the resulting weld 33.

Figure 2:
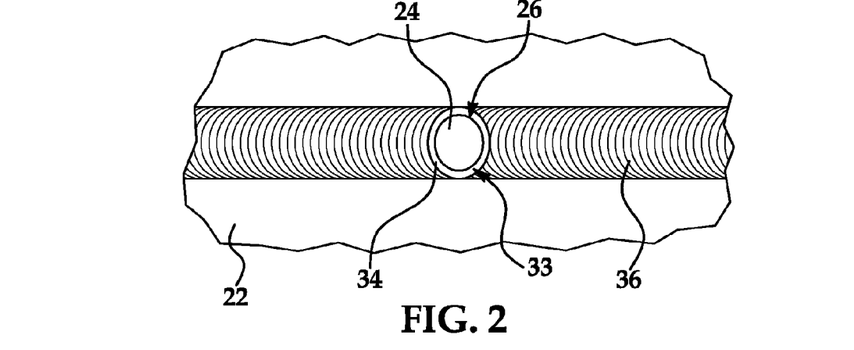
FIG. 2 is an illustration of a plan view of a circumferential friction stir weld on a barrel section, including a termination hole closed with a friction plug weld.

FIG. 2 illustrates a typical application in which a friction stir weld 36 extends circumferentially around a cylindrical workpiece 22 and terminates in a hole 26 in the workpiece 22 caused by withdrawal of a friction stir weld probe (not shown). The apparatus shown in FIG. 1 may be employed to close the hole 26 by friction plug welding, in which a weld plug 24 fills the hole 26 and is joined to the workpiece 22 by a weld 33 that is reinforced by a weld land 34 surrounding the weld 33.

Figure 3:
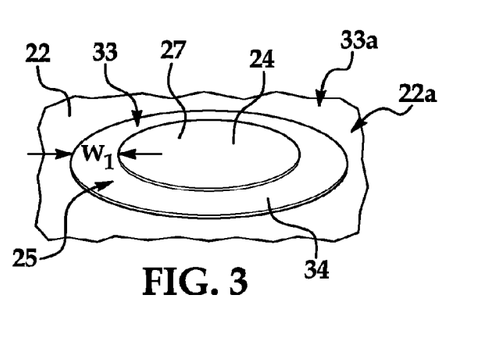
FIG. 3 is an illustration of an isometric view of one side of a workpiece having a friction plug weld, and showing a reinforcing weld land.
Figure 4:
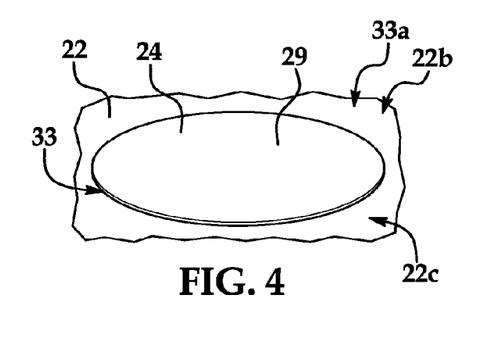
FIG. 4 is an illustration similar to FIG. 3 but showing the opposite side of the workpiece.

FIGS. 3 and 4 illustrate a reinforced friction plug weld 33 made according to the disclosed embodiments. A raised, ring shaped weld land 34 having a width $W_1$ is formed in one side 22a of the workpiece 22 shown in FIG. 3 which surrounds one end 27 of the plug 24 and reinforces a weld between the plug 24 and the workpiece 22. FIG. 3 illustrates the root side 33a of the weld 33, while FIG. 4 illustrates the face side of the weld 33. In FIGS. 3 and 4, the ends 27, 29 of the plug 24 have been cut off.

Figure 5:
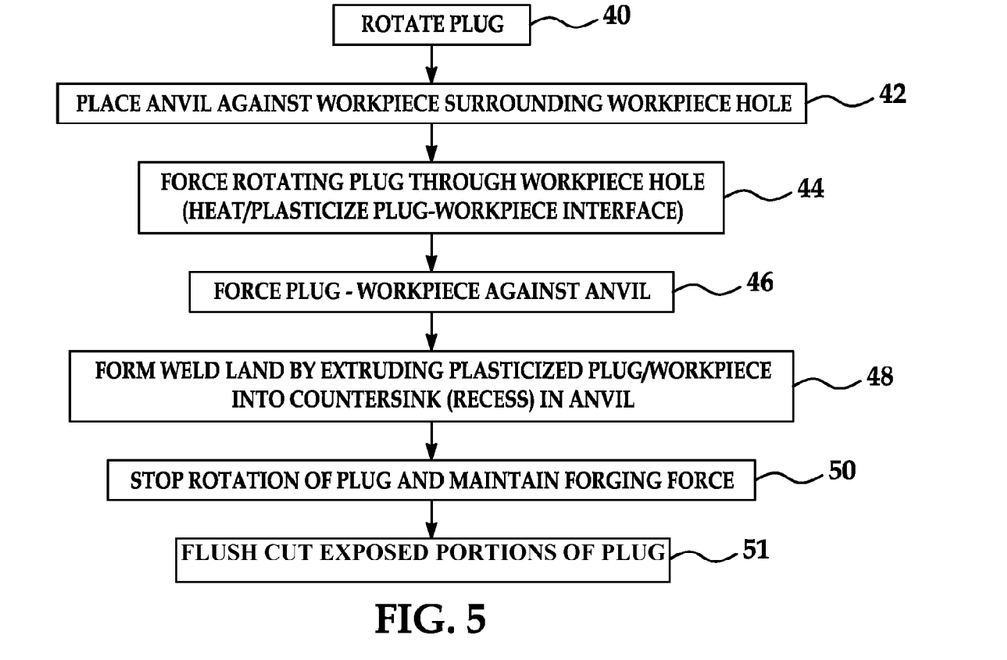
FIG. 5 is an illustration of a simplified flow chart showing the steps of a method of making reinforced friction plug welds.

FIG. 5 broadly illustrates the basic steps of a method for forming a reinforced friction plug weld 33 described generally above. Beginning at step 40, the plug 24 is rotated about its axis 21 (FIG. 1) at a desired speed and a selected level of torque. The anvil 32 is placed against one side 22a of the workpiece 22, overlying and substantially aligned with the workpiece hole 26, as shown in step 42. At 44, the rotating plug 24 is forced through the workpiece hole 26 resulting in the interface 23 between the plug 24 and the workpiece 22 becoming plasticized through frictional heat. As shown in 46, the plug 24 continues its displacement until it is forged against the anvil 32.

At step 48, the weld land 34 is formed on the root side 33a of the weld 33, surrounding one end 27 of the plug 24 as a result of the extrusion of the plasticized plug 24 and partial collapse of a portion of the workpiece 22 into a later discussed countersink 32c (FIG. 6) in the anvil 32. At step 50, rotation of the plug 24 is stopped while forging force 30 (FIG. 1) is maintained on the plug 24 for a period of time until the weld 33 is complete. Finally, at step 51, the exposed portions of the plug 24 extending beyond the workpiece 22 on both the root side 33a and the face side 33b of the weld 33 the may be flush cut away from the workpiece 22.

Figure 6:
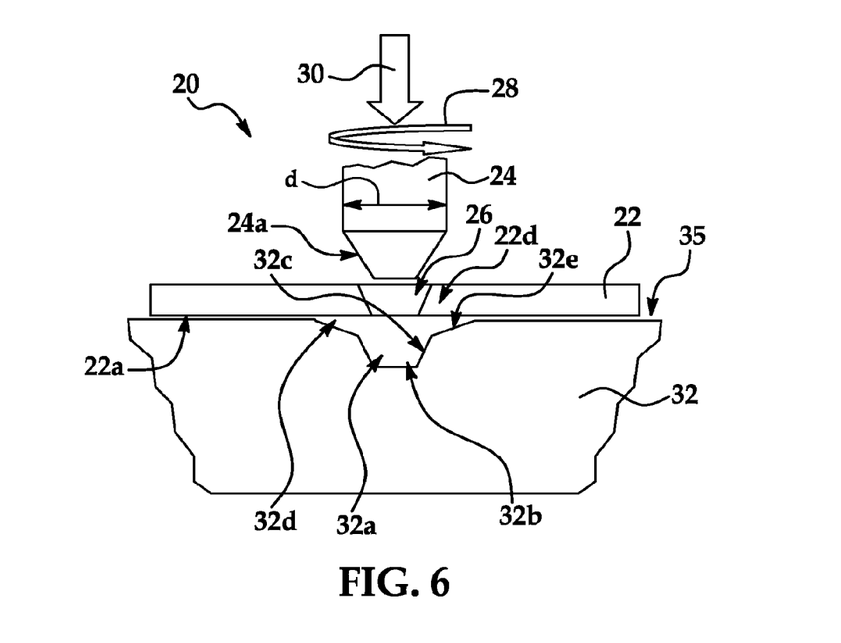
FIG. 6 is an illustration of a cross sectional view of apparatus for making reinforced friction plug welds, and showing the plug immediately before insertion into the workpiece hole.

Attention is now directed to FIG. 6 which illustrates additional details of an embodiment of the apparatus 20 for forming a reinforced friction plug weld. In this example, a cylindrical metal plug 24 made, as by machining or casting to a desired diameter d, includes a lower tapered tip 24a that is axially aligned with a hole in a workpeice 22. In the illustrated example, the workpiece hole 26 is shown as being tapered however, other cross sectional shapes are possible, including, without limitation, a hole 26 having straight sides (not shown). The diameter d of the plug 24 is greater than the maximum diameter of the hole 26.

An anvil 32 has an upper face 35 adapted to engage one side 22a of the workpiece 22, in substantially face-to-face contact. The anvil 32 includes a circular cavity 32a having a central circular depression 32b for receiving the tip 24a of the plug 24. The circular depression 32b is defined by lower inclined sidewalls 32c and an upper, tapered countersink 32d formed by an inclined countersink wall 32e. While the countersink 32d is shown as having a tapered profile due to the inclination of the countersink wall 32e, other profiles are possible. Also, the cavity 32a as well as the depression 32b may have a shape other than circular. The countersink wall 32e extends radially outward beneath the workpiece 22, so that the workpiece 22 forms a ledge-like lip 22d overhanging the countersink wall 32e.

Figure 7:
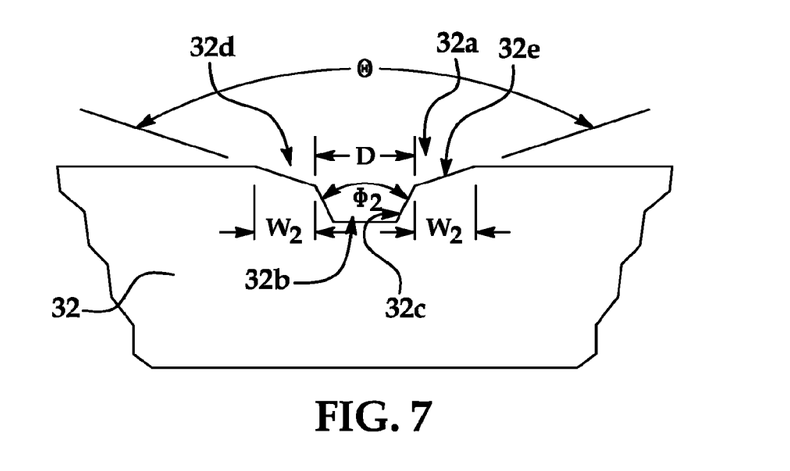
FIG. 7 is an illustration of a cross sectional view of an anvil forming part of the apparatus shown in FIG. 6.
Figure 8:
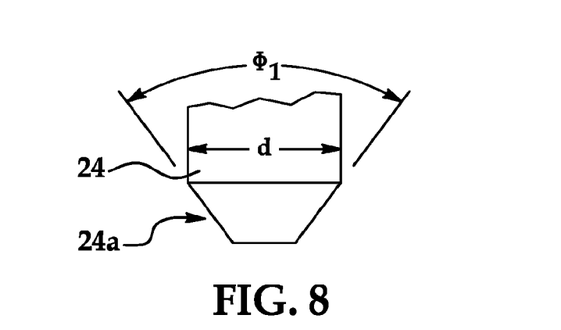
FIG. 8 is an illustration of the tip of the plug forming art of the apparatus shown in FIG. 6.

FIGS. 7 and 8 illustrate additional details of the anvil 32 and the plug 24, respectively. The diameter D of the central cavity 32a may be marginally greater than the diameter d of the plug 24. The included angle θ defining the inclination of the tapered countersink 32d, i.e. the angle between opposite sides of the countersink wall 32e, may vary widely, depending on the application, and may or may not be substantially different than the included angle $\Phi_1$ defining the inclination of the tapered tip 24a of the plug 24. As will be discussed later, higher values of θ result in a tapered countersink 32d having a greater width $W_2$, which in turn produces a weld land 34 having a greater width $W_1$ (FIG. 3). The included angle $\Phi_1$ of the tapered tip 24a of the plug 24 may be generally similar to the included angle $\Phi_2$ of the sidewalls 32c defining the depression 32b. In some applications, a relatively large included angle θ may be desirable, irrespective of the included angle $\Phi_1$ of the tapered tip 24a of the plug 24. For example, and without limitation, in one practical embodiment, an included angle θ of approximately 90 degrees was found to provide substantially optimal results. A larger included angle θ increases the width $W_2$ of the countersink 32d, thereby increasing the cross sectional area of the weld land 34. A weld land 34 having a greater cross sectional area may aid in reducing stress applied to the weld 33. Additionally, a relatively large included angle θ may shorten the amount of displacement of the plug 24 required to completely fill the anvil cavity 32a, which may allow the weld 33 to be made with lower overall heat input, and therefore possibly less degradation of material properties.

Referring again to FIG. 6, a friction plug weld is completed by the apparatus 20 in essentially two phases. The first phase begins at weld initiation, and ends when cavity 32a including the countersink 32d has been filled by the plug 24. During this first phase, the combination of the frictional heat generated by the engagement of the plug 24 with the workpiece 22 and the downward force 30 applied to the plug 24 is sufficient to plasticize the plug 24 so that it may be extruded into the cavity 32a. The plug 24 continues to plunge into the cavity 32a in the anvil 32 until the cavity 32a including the countersink 32d, are substantially completely filled. The second phase of making the weld 33 starts when the cavity 32a in the anvil 32 has been filled with the plug material 24 and ends when the weld 33 is complete.

Figure 9:
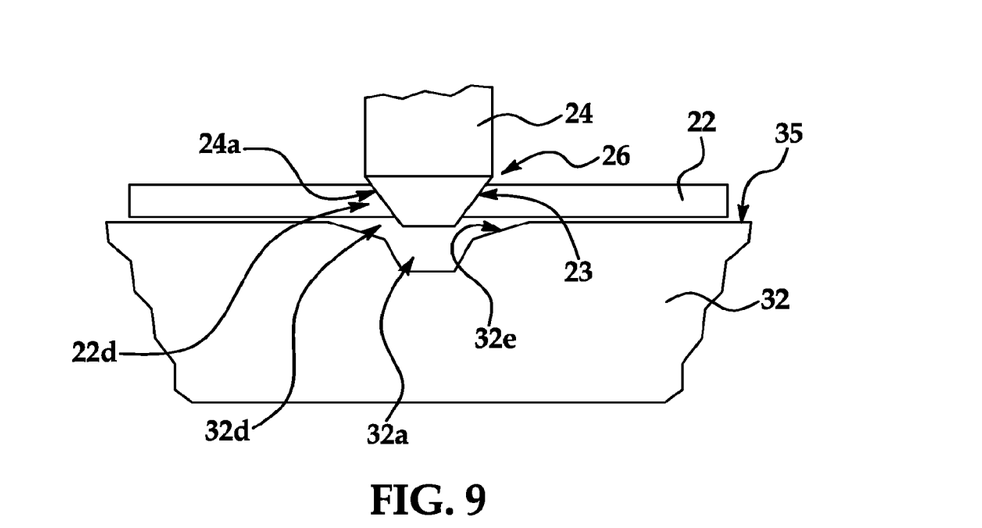
FIGS. 9-11 are cross sectional views of the apparatus shown in FIG. 6, respectively showing the progressive stages of making a friction plug weld.
Figure 10:
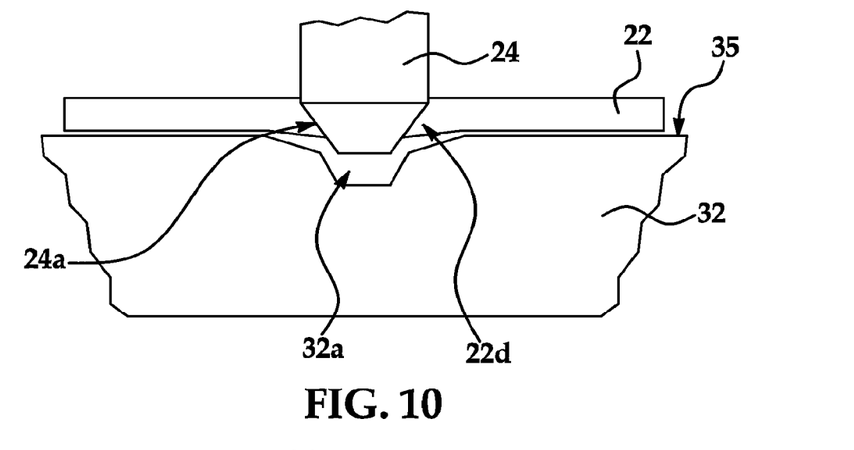
Figure 11:
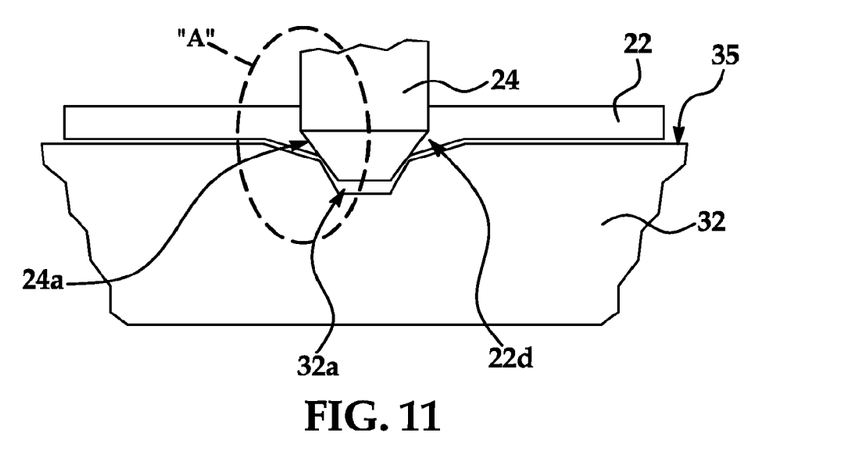

FIGS. 9, 10 and 11 respectively show the progressive stages of making a friction plug weld 33 having a reinforcing weld land 34 using the apparatus 20. In FIG. 9, the tapered tip 24a of the spinning plug 24 is forced down into the workpiece hole 26 and frictionally engages the workpiece 22 around the hole 26, thereby heating and plasticizing both the plug 24 and the workpiece 22 in the area of their frictional interface 23. Because the plug diameter d (FIG. 6) is greater than that of the workpiece hole 26, the plug 24 forces the workpiece 22 tightly against the anvil 32. The heat frictionally generated at the interface 23 extends radially outwardly to include the surrounding lip 22d on the workpiece 22, thereby plasticizing the lip 22d so that it may be displaced downward into the countersink 32d and against the countersink wall 32e.

Figure 12:
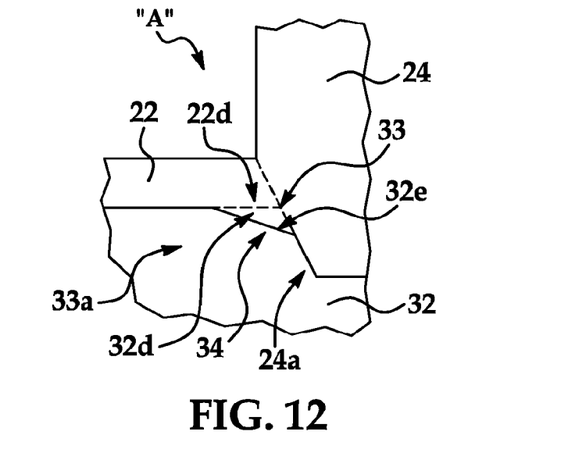
FIG. 12 is an illustration of the area designated as "A" in FIG. 11.

FIG. 10 shows the plug 24 having been displaced slightly further toward the anvil 32, causing the plasticized lip 22d to begin being displaced or folded over into the countersink 32d, and particularly toward the countersink wall 32e. FIGS. 11 and 12 show the final displacement of the plug 24 in which the plug 24 has engaged the anvil 32 and has displaced the workpiece lip 22d into the cavity 32a and pressed it against the countersink wall 32e, thereby forming the weld land 34 around the root side 33a of the weld 33 (FIG. 12).

Figure 13:
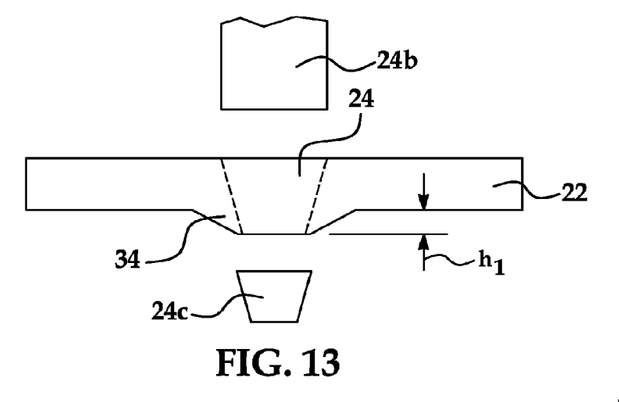
FIG. 13 is an illustration of a side view showing excess portions of the plug being removed from the workpiece following welding.

Referring to FIG. 13, upon completion of a weld, portions 24b, 24c of the plug 24 that extend beyond the workpiece 22 may be removed, as by sawing, grinding or other processes, leaving a weld land 34 having a height $h_1$ which surrounds the welded plug 24.

Figure 14:
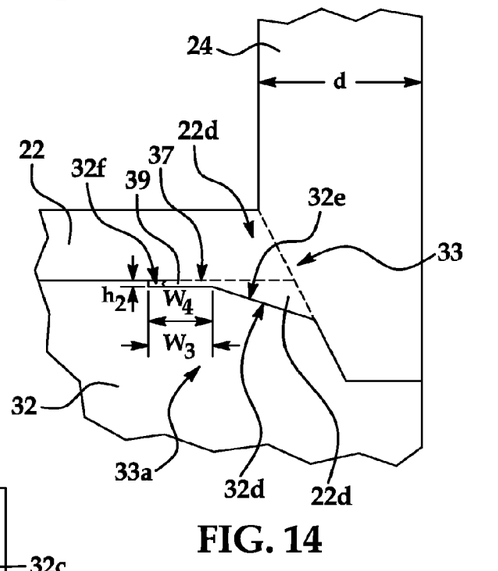
FIG. 14 is an illustration similar to FIG. 12, but showing a modified form of the anvil having recess for forming a coin around the weld land.
Figure 15:
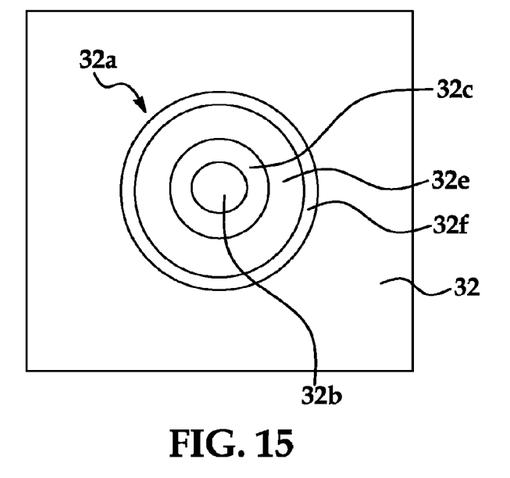
FIG. 15 is an illustration of a plan view of the modified anvil shown in FIG. 14.

Attention is now directed to FIGS. 14 and 15 which illustrate another embodiment of the apparatus 20 that is similar to that shown in FIGS. 6-12, but wherein a ring shaped recess 32f is formed in the anvil 32. The recess 32e is contiguous with, and extends radially outward from the countersink wall 32e. Although the recess 32f is shown as having a rectangular cross section in the illustrated embodiment with a preselected height $h_2$ and width $W_3$, other cross sectional shapes are possible. The recess 32f may be formed in the anvil 32 by machining or other process.

The recess 32f allows a ring-shaped coin 39 to be formed on the root side 33a of the weld 33 that is effectively a relatively shallow radial extension of the weld land 34. Formation of the coin 39 begins during phase one of the weld 33 discussed previously, and continues throughout phase two. The plasticized material from the workpiece lip 22d and/or the plug 24, is displaced radially outward as the weld progresses, and a portion 37 (FIG. 14) of this material may be extruded into the recess 32f to form the coin 39. The width $W_4$ of the coin 39 increases as displacement of the plug 24 continues through phase two of the weld. The final width $W_4$ of the coin 39 may be determined by the diameter d of the plug 24 and the amount of material from the workpiece 22 that is displaced by the plug 24. Larger diameters of the plug 24 result in a wider coin 39. The height of the coin 39 is determined by the height $h_2$ of the recess 32f in the anvil 32. The coin 39 may add additional strength around the weld 33 which may reduce the amount of tensile loads transmitted through the workpiece 22 to the weld 33.

Figures 16, 17, 18:
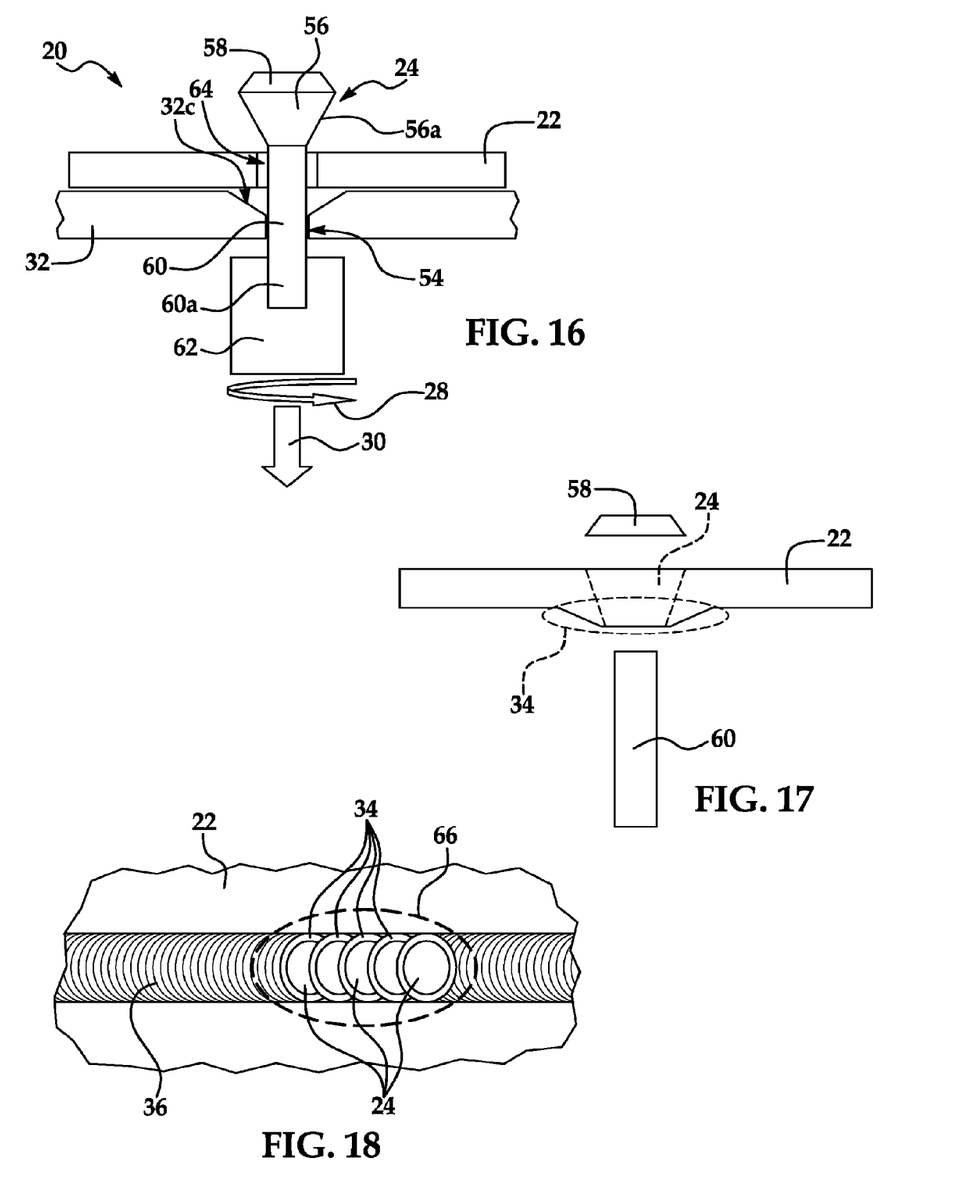
FIG. 16 is an illustration of a sectional view showing an alternate form of apparatus for making reinforced friction plug welds.
FIG. 17 is an illustration a side view showing a fully formed weld made by the apparatus of FIG. 16, wherein excess portions of the plug are being removed.
FIG. 18 is an illustration of a plan view of a workpiece having a weld that has been reworked using reinforced, overlapping friction plug welds.

Attention is now directed to FIGS. 16 and 17 which illustrate another form of the apparatus 20. In this example, the hole 64 in the workpiece 22 is cylindrical and the plug 24 includes a shaft 60 that extends through both the hole 64 and an opening 54 in the anvil 32. The lower end 60a of the shaft 60 is held in a chuck 62 that rotates, as shown by the arrow 28, and is drawn axially downward by a force indicated by the arrow 30. The upper end of the plug 24 includes a tapered head 56 including a cap 58. In this example, the chuck 62 rotates the plug 24 while pulling it downwardly through the anvil 32 so that the tapered sides 56a of the head 56 engage the workpiece 22 to create the necessary frictional heat which plasticizes the head 56. As the head 56 becomes plasticized, it is extruded downwardly through the workpiece hole 64 into the countersink 32c where it solidifies to form the weld land 34, similar to the example previously described in connection with FIGS. 6-13. Following completion of the weld, as shown in FIG. 17, the cap 58 of the head 56, as well as the shaft 60 may be removed from the plug 24.

As previously discussed, the disclosed method and apparatus for forming reinforced friction plug welds may be employed in various applications including closing termination holes formed during friction stir welding and to attach parts to structures. Also, as shown in FIG. 18, the disclosed embodiments may be employed to rework an area of a weld 36 which may not have desired performance standards. In this example, a series of overlapping holes (not shown) are successively formed and then closed with plugs 24 using the disclosed friction plug welding method in which each of the welded plugs is surrounded by a weld and 34. The reinforced friction plug welds may restore the area 66 of the weld 36 to the desired performance standards.

Figure 19:
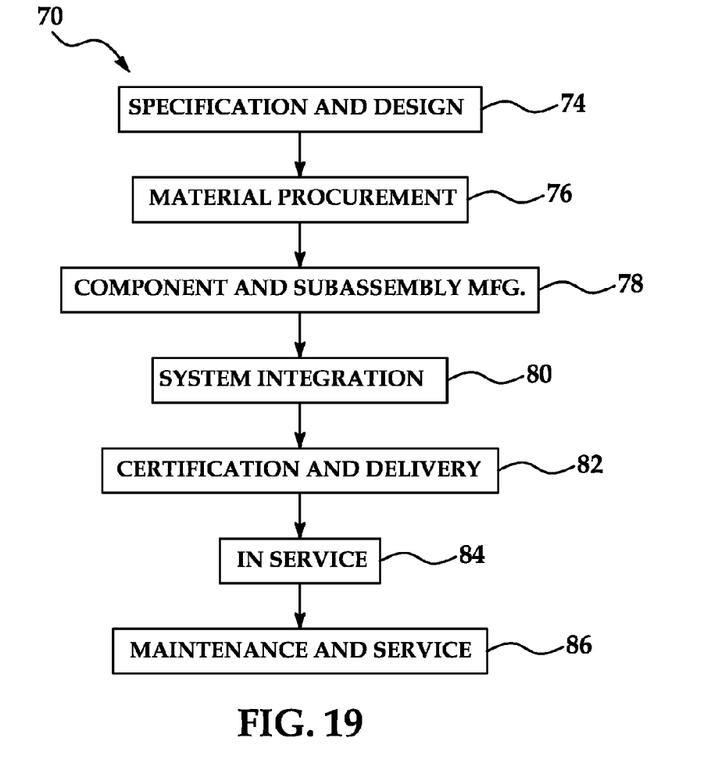
FIG. 19 is an illustration of a flow diagram of aircraft production and service methodology.
Figure 20:
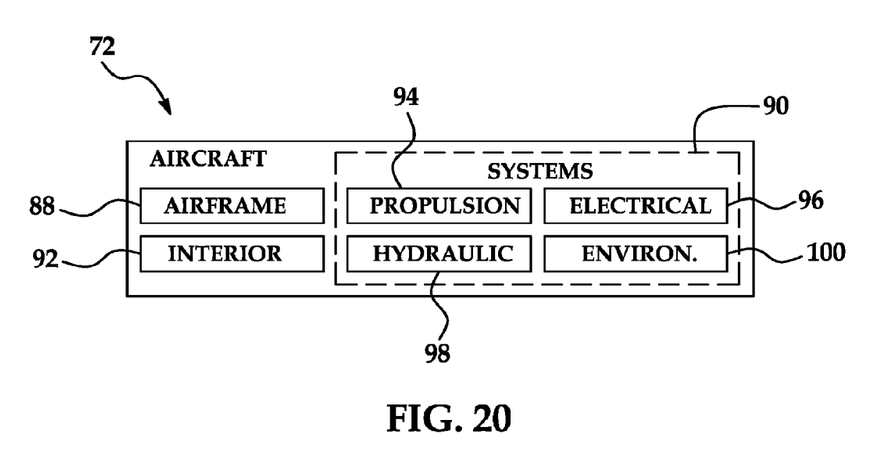
FIG. 20 is an illustration of a block diagram of an aircraft.

Embodiments of the disclosure may find use in a variety of potential applications, particularly in the transportation industry, including for example, aerospace, marine and automotive applications. Thus, referring now to FIGS. 19 and 20, embodiments of the disclosure may be used in the context of an aircraft manufacturing and service method 70 as shown in FIG. 19 and an aircraft 72 as shown in FIG. 20. During pre-production, exemplary method 70 may include specification and design 74 of the aircraft 72 and material procurement 76 in which the disclosed reinforced friction plug welds may be specified for use in assembling parts or components used in the aircraft 72. During production, component and subassembly manufacturing and system integration 80 of the aircraft 72 takes place. The disclosed method and apparatus may be used to fasten or join parts during these production processes. Thereafter, the aircraft 72 may go through certification and delivery 82 in order to be placed in service 84. While in service by a customer, the aircraft 72 is scheduled for routine maintenance and service 86 (which may also include modification, reconfiguration, refurbishment, and so on). The disclosed method and apparatus may be used to repair parts or components during the maintenance and service 86.

Each of the processes of method 70 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 72 produced by exemplary method 70 may include an airframe 88 with a plurality of systems 90 and an interior 92. The disclosed method and apparatus may be used to form reinforced welds on parts which form part of, or may be installed on the airframe 88. Examples of high-level systems 90 include one or more of a propulsion system 94, an electrical system 96, a hydraulic system 98, and an environmental system 100. Any number of other systems may be included. Although an aerospace example is shown, the principles of the disclosure may be applied to other industries, such as the marine and automotive industries.

The disclosed method and apparatus may be employed to make welds during any one or more of the stages of the production and service method 70. For example, components or subassemblies corresponding to production process 78 may incorporate parts that are welded using the disclosed method and apparatus. Also, one or more method embodiments, or a combination thereof may be utilized during the production stages 78 and 80, for example, by substantially expediting assembly of or reducing the cost of an aircraft 72. Similarly, the disclosed method and apparatus may be used to weld parts that are utilized while the aircraft 72 is in service.

Although the embodiments of this disclosure have been described with respect to certain exemplary embodiments, it is to be understood that the specific embodiments are for purposes of illustration and not limitation, as other variations will occur to those of skill in the art.

What is claimed:

1. An apparatus configured to reinforce a friction plug weld in a workpiece, the apparatus comprising:
 a chuck configured to rotate a plug and to force the plug through a hole through the workpiece, the hole comprising a first width on a root side of the workpiece and a second width on a face side of the workpiece;
 the plug configured to: forge weld to the workpiece, and plastically deform to comprise: a weld land surrounding a root side end of the plug, and a coin surrounding the weld land; and
 an anvil adapted to be placed against a root side of the workpiece, the anvil comprising:
  a first cavity configured to receive a tip of the plug, the first cavity being further from the workpiece than a second cavity and a third cavity;
  the second cavity configured to substantially surround the first cavity and extrude a first plasticized portion of the plug to form the weld land, the second cavity comprising a width and a depth that are larger and smaller respectively relative to the first cavity, the width of the second cavity being greater than the first width of the hole; and
  the third cavity configured to extend outward around the second cavity and extrude a second plasticized portion of the plug to form the coin, such that the third cavity comprises a height that is less than a width of the third cavity.

2. The apparatus of claim 1, wherein:
 the first cavity comprises a central depression in the anvil for receiving the tip of the plug, and
 the second cavity comprises a countersink in the anvil surrounding the depression.

3. The apparatus of claim 2, wherein the countersink includes a wall facing the workpiece.

4. The apparatus of claim 1, further comprising the chuck configured to rotate the plug about a longitudinal axis of the plug, and simultaneously force the plug through the hole.

5. The apparatus of claim 1, wherein the first cavity further comprises a bottom that faces the workpiece.

6. The apparatus of claim 1, further comprising the first cavity comprising an inclined sidewall comprising a first angle being substantially equal to a second angle of the tip.

7. The apparatus of claim 1, further comprising a diameter of the plug being greater than a maximum width of the hole.

8. The apparatus of claim 1, further comprising the first cavity comprising a central depression comprising a circular shape.

9. The apparatus of claim 1, further comprising the second cavity comprising a sidewall being inclined away from a longitudinal axis of the plug.

10. The apparatus of claim 1, further comprising the weld land configured to reduce stress applied to the friction plug weld.

11. The apparatus of claim 1, wherein the weld land further comprises a collapsed portion of the workpiece.

12. The apparatus of claim 1, wherein the coin further comprises a plasticized material from a root side lip of the workpiece, the lip being adjacent to the hole.

13. The apparatus of claim 1, further comprising a width of coin being determined by a width of the plug.

14. The apparatus of claim 1, further comprising the coin configured to reduce an amount of tensile loads transmitted through the workpiece to the friction plug weld.

15. The apparatus of claim 1, wherein the first cavity further comprises:
 a central axis being substantially collinear with a longitudinal axis of the plug, and a sidewall inclined outward from the longitudinal axis of the plug.

16. The apparatus of claim 1, further comprising the tip of the plug being directly connected to a shaft configured to connect to the chuck, the chuck being configured to pull the plug through the hole.

* * * * *